Aug. 22, 1950    A. F. TURNER    2,519,722
METALLIC MIRROR AND METHOD OF MAKING SAME
Filed Sept. 20, 1946

ARTHUR F. TURNER
Inventor

Attorney

Patented Aug. 22, 1950

2,519,722

UNITED STATES PATENT OFFICE 2,519,722

METALLIC MIRROR AND METHOD OF MAKING SAME

Arthur F. Turner, Brighton, N. Y., assignor to Bausch & Lomb Optical Company, Rochester, N. Y., a corporation of New York Application September 20, 1946, Serial No. 698,387

7 Claims. (Cl. 88—105)

This invention relates to mirrors and more particularly it has reference to metallic mirrors which are used for reflecting white light or any other extended spectral range.

All of the light rays which are incident upon a polished metallic surface are not reflected by the surface since a small portion of the rays is absorbed. Thus for white light rays, the reflectivity of silver is about 98% while those of aluminum and rhodium are about 92% and 75%, respectively. While a polished silver surface is generally regarded as being the most efficient reflector for white light, such a surface is not very durable since it is relatively soft and not very resistant to chemical action. The more durable materials, such as aluminum or rhodium, though having lower reflectivities than silver, are accordingly used as reflectors where mechanical strength and chemical resistance are necessary.

One of the objects of the present invention is to provide metallic mirrors having increased reflectivities for white light or any other extended spectral range. Another object is to provide a method for increasing the reflectivity of a metallic mirror for white light. Still another object is to provide a metallic mirror embodying a protective coating which also serves to increase the reflectivity of the mirror for white light. These and other objects and advantages reside in certain novel features of construction, arrangement and combination of parts and in the methods of applying and arranging same as will hereinafter be more fully described and pointed out in the appended claims.

In the practice of my invention, superposed, light-transmitting layers of non-metallic materials having low and high indices of refraction, respectively, are deposited alternately on a metallic reflecting surface so that each layer has approximately the thickness of a quarter wave length of light in the portion of the spectrum from about 500 to 600 mu. The thin films may be applied by any suitable method such as thermal evaporation in vacuo, chemical vapor, or the "drop and spin" method. The materials used for the low index films include cryolite, magnesium fluoride, and other metallic fluorides and the high index films may be formed, for example, of such materials as zinc sulphide, aluminum oxide, titanium oxide, or tin oxide. By the application of my invention, I have, for example, succeeded in increasing the reflectivity of aluminum for white light from about 92% to about 99%. In addition to the increased reflectivity, the multiple film deposit also serves to protect the softer metallic mirrors against abrasion and chemical attack.

On page 1128, volume 55, Physical Review, June 1, 1939, Turner and Cartwright describe a method of increasing the reflectivity of glass for a selected wave length of light by depositing alternately thereon thin films of materials of respectively high and low indices of refraction and each having thicknesses of about one quarter wave length of the light to be reflected. While the reflectivity of a polished glass surface may be increased thereby, it can only be accomplished for a relatively narrow wave length band and hence the reflectivity of glass for white light would not be uniformly increased. I have found, however, that the white light reflectivity of a metallic surface can be increased by applying the alternate thin films of materials of different refractive indices to the metallic reflecting surface.

The invention will be more fully described and pointed out in the following description with reference to the drawings in which.

Figure 1:
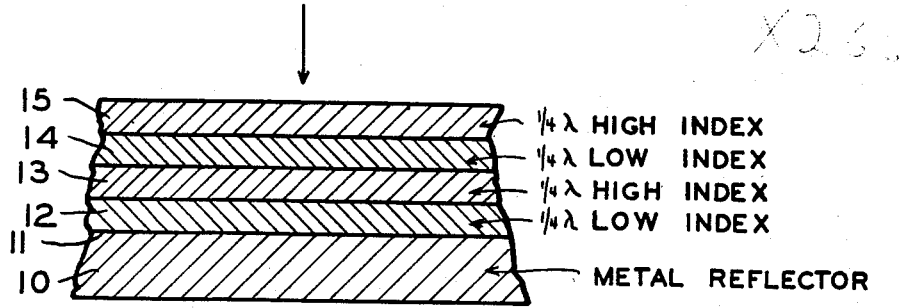
Fig. 1 shows an enlarged sectional view of a reflector bearing the superposed films.

As pointed out by Turner and Cartwright, supra, the reflectivity of a bare glass surface may be increased by the application of alternate thin films of transparent material of different refractive indices each having an optical thickness of a quarter of a selected wave length of light. In order to obtain the full benefit of the preceding films, the last film applied must have a high refractive index. If the phase relations between the amplitude reflection vectors from the interfaces of such a combination layer are considered, it is found that they are all in phase for the wave length for which each component film is optically one-quater wave thick. Hence, maximum reflection occurs at this wave length. As more low-high index pairs of film are added, the value of the maximum reflectivity increases, while the reflectivities on either side of the peak or maximum reflectivity decrease rapidly. A peak reflectivity for glass of about 88% can, for example, be obtained by five quarter wave films of zinc sulphide and cryolite. If this peak is located at about 450 mu, the reflectivity drops rapidly to a minimum of about 7% at about 700 mu. This is graphically shown by the curve A on Fig. 2 of the drawing. Such a strong dispersion of the reflectivity will, of course, limit the usefulness of such a reflector with white light.

I have discovered, however, that the reflectivity over a relatively wide wave length band may be increased by applying the thin films to a metallic reflecting surface. As a consequence, I am able to provide a widely useful, practical method for increasing the reflectivity of metallic mirrors for white light. My invention can be successfully applied for increasing the reflectivities of reflecting surfaces formed on various types of metals and alloys. Thus, for example, I have, by the application of my invention, increased the reflectivity for white light of surfaces made, respectively, of aluminum, rhodium, and an alloy sold under the trade-mark "Inconel" and containing about 80% nickel, 13% chromium, and 6% iron.

One embodiment of the invention is illustrated in Fig. 1 wherein 10 indicates a metal reflector having the reflecting surface 11 on which is deposited the film or layer of material 12 having a low refractive index which in turn carries the film or layer of material 13 having a higher refractive index. Another film or layer 14 of low refractive index material is deposited on layer 13 and a final film 15 of high refractive index material is deposited on film 14. It is to be understood that the reflecting surface 11 may be formed either by polishing an area on a solid sheet or plate of metal 10, such as aluminum, or by depositing a metallic reflecting layer on a suitable support such as a glass plate, for example. Although the films or layers 12, 13, 14, and 15 may be deposited by any suitable method, I have obtained good results by forming the layers by the well-known process of thermal evaporation in a vacuum.

The films 12 and 14, having the lower refractive index, may be formed of any of the commonly used anti-reflection film materials such as cryolite, magnesium fluoride, and other metallic fluorides while the films 13 and 15, having the higher refractive index, may be formed of any of such materials as zinc sulphide, aluminum oxide, titanium oxide, or tin oxide. The only requirement of the film materials as it relates to refractive index is that film 12 must have a lower index than film 13 and that film 14 must have a lower index than films 13 and 15. Films 12 and 14 do not necessarily have to have the same index nor do films 13 and 15 necessarily have to be of the same index. From a practical standpoint, however, it is desirable that the difference between the refractive indices of the alternate materials be as great as possible in order to produce a maximum increase in reflectivity with a minimum number of film pairs.

When using films of a quarter wave length thickness, it is essential that the film of the lower index be deposited on the metallic reflecting surface. The sequence of deposition would then be as follows: metal reflecting surface, low index film, high index film, low index film, high index film. Increased reflectivity may also be obtained if a high index film about one-half wave length in thickness is placed directly on the metal reflecting surface and then followed with superposed pairs of low-high index films with each film a quarter wave in thickness. The use of a sequence starting with a half-wave high index film on a metallic reflecting surface results in an increased dispersion of the reflectivity which is undesirable when the reflector is to be used with white light. Consequently, for metal reflectors, embodying my invention, which are intended for normal use, namely, reflecting white light, the sequence of quarter wave films would be: metal, low index film, high index film, etc.

Figure 2:
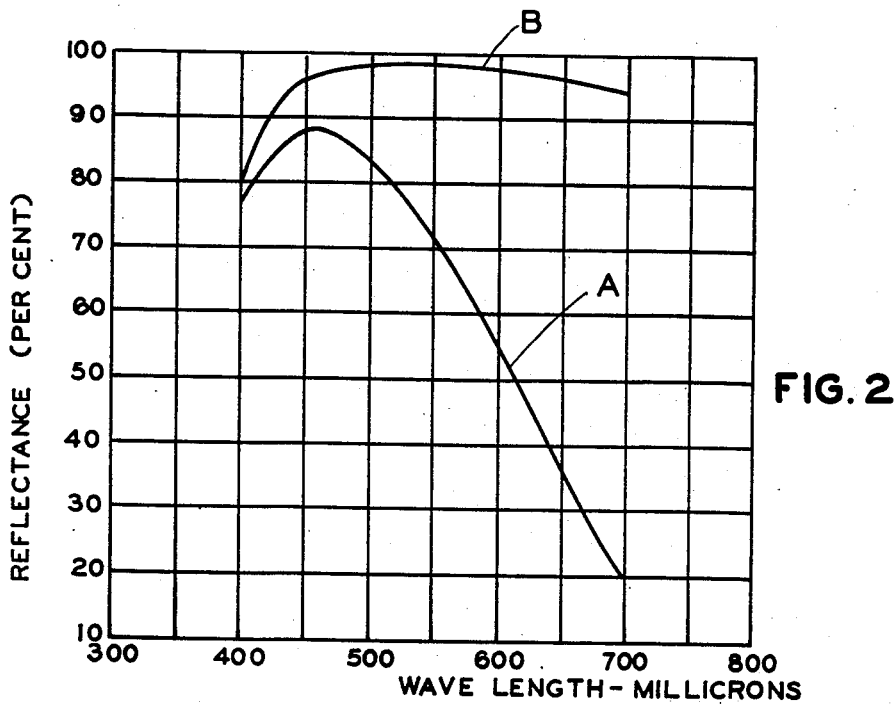
Fig. 2 is a graph showing the relation between the reflectance and wave length of reflected light for one form of reflector embodying our invention and also the relation between reflectance and wave length when the reflectivity of glass is increased by the use of superposed thin films.

For a metallic reflector embodying my invention, the relation between reflectance and wave length of light is generally indicated by the curve B on Fig. 2. As will be noted, the reflectivity decreases slowly on either side of the maximum or peak and then changes quite rapidly, especially towards the shorter wave lengths. From the relation between the reflectivities and wave lengths, I determine the accuracy which is required in controlling the thicknesses of the films for reflectors which are to be used with light of a given range of wave lengths. For the visible spectral range, I have determined that the films deposited on the reflector should have a thickness of a quarter wave length in the region of about 500–600 millimicrons. The quarter wave films applied to the metal reflector must be controlled as to thickness to about ±5%. The dispersion of reflectivity is smaller for a single pair of low index-high index films on metal than for a double pair of low index-high index films and hence the latter must be controlled in thickness even more exactly. It may be noted that the film which is deposited directly on the metal reflecting surface will not have an optical thickness of exactly one-quarter wave length, but will deviate somewhat from this value, depending on the particular metal which is used. However, for practical purposes, it can be regarded as having an optical thickness of one quarter wave length. The other films must, however, have optical thicknesses which are held to the above-mentioned tolerances.

The thicknesses of the films produced by evaporation may be controlled visually by observing a bare glass monitor which is placed in the evacuated chamber adjacent the reflector which is to be filmed. The optimum results for a reflector to be used for white light are obtained when the low index film exhibits a good purple color and the multiple layer a very light yellow-green color. The thicknesses of the films may also be controlled by employing a photo-electric cell in a manner well-known in the art. In this procedure, monochromatic light reflected from the monitor surface is received by a photo-electric cell and the output of the latter is measured by a meter which may be calibrated in terms of film thickness.

By the use of my invention I have, for example, increased the white light reflectivity of a polished aluminum surface from about 92% to about 96% by applying a pair of quarter wave low index-high index films formed, respectively, of cryolite and zinc sulphide. By applying a second superposed pair of these films the white light reflectivity is further increased to about 99%. The curve shown at B on Fig. 2 indicates the reflectivity for an aluminum reflector which has been filmed as just described. Since the aluminum reflecting surface is relatively soft and susceptible to chemical attack, the thin films of non-metallic material, since they are relatively durable and resistant to chemical action, also serve to protect the reflecting surface.

Figure 3:
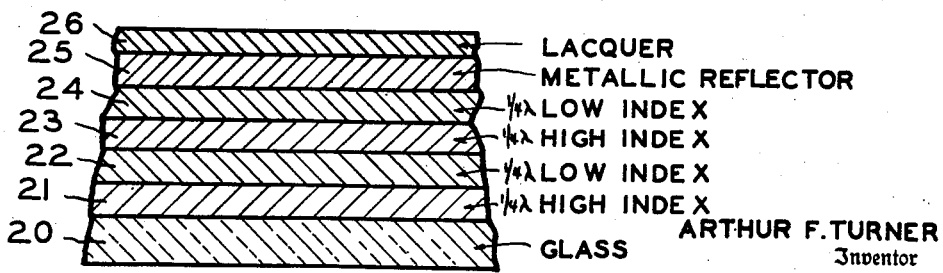
Fig. 3 is an enlarged sectional view of a second surface mirror embodying my invention.

While the structure shown in Fig. 1 illustrates the application of my invention to a so-called first surface mirror, my invention may also be used to advantage for increasing the white light reflectivity of a second surface mirror having, for example, the structure shown in Fig. 3. Such a second surface mirror may comprise the transparent supporting plate 20, formed of glass or other suitable material. On the surface of plate 20 there are deposited the superposed pairs of quarter wave films of transparent material 21, 22 and 23, 24 with the films 21 and 23 formed of material of high refractive index and the films 22 and 24 formed of material having a low refractive index. Films 22 and 24 must have lower refractive indices than films 21 and 23 and film 21 must have a higher refractive index than glass 20. On film 24 there is deposited an opaque layer 25 of metallic material which will reflect light rays which pass through the transparent plate 20 and the pairs of transparent films 21, 22 and 23, 24. A coating 26 of lacquer or varnish may be applied on layer 25 in order to protect the latter against damage from corrosion or abrasion.

From the foregoing, it will be apparent that I am able to attain the objects of my invention and provide metallic reflectors having increased white light reflectivities and methods of producing the same. The films may, of course, be applied to the metallic reflecting surface by any suitable method and means which will afford films having the proper requirements as to refractive indices and permit the required controls as to film thicknesses. Various modifications may obviously be made without departing from the spirit of my invention as pointed out in the appended claims.

I claim:

1. The method of increasing the reflectivity of a metallic mirror over an extended spectral range which comprises depositing on the surface of the mirror a first transparent layer of material having a thickness of substantially the order of ¼ wave length of the radiation centrally located in said range, and depositing on said first layer a second transparent layer of material having an optical thickness substantially equal to the thickness of the first layer, the refractive index of the material of the first layer being lower than that of the second layer.

2. A mirror comprising a metallic reflecting surface, and means on the surface for increasing the reflectivity of the surface over an extended spectral range, said means comprising at least one pair of superposed transparent layers in contact with each other and formed of respectively different materials, the layer in contact with the surface having a refractive index which is lower than that of the other layer, each layer having an optical thickness which is of the order of ¼ wave length of light in said spectral range.

3. A mirror comprising a metallic reflecting surface, and means on the surface for increasing the reflectivity of the surface for white light, said means comprising at least one pair of superposed transparent layers in contact with each other and formed of respectively different materials, the layer in contact with the surface having a refractive index which is lower than that of the other layer, each layer having an optical thickness which is substantially of the order of ¼ wave length of light in the portion of the spectrum from about 500 to 600 mu.

4. A mirror comprising an aluminum reflecting surface, and means on the surface for increasing the reflectivity of the surface for white light, said means comprising a transparent layer of magnesium fluoride deposited on the reflecting surface, and a transparent layer of zinc sulphide deposited on said layer of magnesium fluoride, each of said layers having an optical thickness of the order of ¼ wave length of light in the portion of the spectrum from about 500 to 600 mu.

5. A mirror comprising an aluminum reflecting surface and means on the surface for increasing the reflectivity of the surface for white light, said means comprising two pairs of superposed layers of transparent material on the reflecting surface, the first layer being in contact with said surface, the successive layers being in contact with each other, the first and third layers being formed of magnesium fluoride and the second and fourth layers being formed of zinc sulphide, all of said layers having an optical thickness of the order of ¼ wave length of light in the portion of the spectrum from about 500 to 600 mu.

6. A mirror comprising a metallic reflecting surface and means on the surface for increasing the reflectivity of the surface for white light, said means comprising four superposed layers of transparent material on the surface, the first layer being in contact with said reflecting surface, the successive layers being in contact with each other, the first layer having a refractive index lower than that of the second layer, the third layer having a refractive index lower than those of the second and fourth layers, each of said layers having an optical thickness of the order of ¼ wave length of light in the portion of the spectrum from about 500–600 mu.

7. A mirror comprising a transparent member and at least one pair of superposed transparent layers deposited on a surface of the member, said layers being formed respectively of different materials, the layer in contact with the surface having a refractive index higher than that of the member, the other layer being deposited on the first named layer and having a refractive index which is lower than that of the first named layer, each layer having an optical thickness which is substantially of the order of ¼ wave length of light centrally located in a pre-selected extended range of the spectrum, and an opague metallic reflecting layer deposited on the uppermost transparent layer whereby the reflectivity of the metallic layer is increased for light rays in said pre-selected extended range of the spectrum which pass through the member and transparent layers.

ARTHUR F. TURNER.

REFERENCES CITED

The following references are of record in the file of this patent:

UNITED STATES PATENTS

| Number | Name | Date |
|---|---|---|
| 2,281,474 | Cartwright et al. | Apr. 28, 1942 |
| 2,366,516 | Geffcken et al. | Jan. 2, 1945 |
| 2,379,790 | Dimmick | July 3, 1945 |
| 2,392,978 | Dimmick | Jan. 15, 1946 |
| 2,394,533 | Colbert et al. | Feb. 12, 1946 |
| 2,397,929 | Dimmick | Apr. 9, 1946 |
| 2,403,685 | Sachtleben | July 9, 1946 |
| 2,412,496 | Dimmick | Dec. 10, 1946 |
| 2,420,168 | Dimmick | May 6, 1947 |
| 2,422,954 | Dimmick | June 24, 1947 |
| 2,430,452 | Colbert et al. | Nov. 11, 1947 |

OTHER REFERENCES

Cartwright and Turner (publication) "Multilayer Films of High Reflecting Power," Bulletin of the American Physical Society, volume 14, #2, April 1939, page 24.